United States Patent
Killian

[15] 3,697,042
[45] Oct. 10, 1972

[54] DUAL ACTION BUTTERFLY VALVE
[72] Inventor: Henry R. Killian, Greensburg, Pa.
[73] Assignee: Walworth Company, Bala Cynwyd, Pa.
[22] Filed: Jan. 21, 1971
[21] Appl. No.: 108,323

Related U.S. Application Data
[63] Continuation-in-part of Ser. No. 843,510, July 22, 1969.

[52] U.S. Cl. .................. 251/163, 251/192, 251/308
[51] Int. Cl. ................................................ F16k 5/20
[58] Field of Search ............ 251/162, 163, 188, 308

[56] References Cited

UNITED STATES PATENTS

| | | | |
|---|---|---|---|
| 3,477,690 | 11/1969 | Murota | 251/163 |
| 2,501,150 | 3/1950 | Anderson | 251/162 X |

FOREIGN PATENTS OR APPLICATIONS

| | | | |
|---|---|---|---|
| 1,147,569 | 6/1957 | France | 251/162 |
| 1,354,188 | 1/1964 | France | 251/163 |
| 373,478 | 5/1932 | Great Britain | 251/308 |

*Primary Examiner*—Harold W. Weakley
*Attorney*—Melvin R. Stidham

[57] ABSTRACT

A rotatable valve structure, such as a butterfly valve, wherein the shaft is movable axially, with a camming surface on the shaft engaging a complementary camming surface on the disc to produce transverse movement of the valve disc in response to axial movement of the shaft. Hence, the valve disc may be turned to a face-to-face position relative to the seat and then, in response to axial movement of the shaft, pressed into firm seating engagement. Both the rotary and axial movements of the shaft are produced by rotary movement of an operator. Means are provided for adjusting the plane of the disc.

6 Claims, 6 Drawing Figures

INVENTOR.
HENRY R. KILLIAN
BY Melvin R Stidham
ATTORNEY

INVENTOR.
HENRY R. KILLIAN

DUAL ACTION BUTTERFLY VALVE

CROSS REFERENCE

This application is a continuation-in-part of my U.S. Pat. application Ser. No. 843,510, filed July 22, 1969 for "Dual Action Butterfly Valve."

BACKGROUND OF THE INVENTION

This invention relates to a dual action butterfly valve and, more particularly, to a butterfly valve which may be moved axially of the flow passage into and out of positive sealing engagement with the valve seat so that it may be rotated while free of frictional engagement with the seat.

In convention quarter turn valves wherein a valve closure member is rotated through ninety degrees between open and closed positions, the closure member slides across valve seat surfaces on the body during such movements. However, in certain installations, such as in vacuum systems, wherein there can be no lubricating medium, or in cryogenic or elevated temperature use, wherein material may be particularly susceptible to damage, sliding engagement of sealing surfaces is best avoided. Also, in some butterfly valves, where the seal is achieved solely through engagement of a resilient body seal member around the periphery of the valve disc, the effectiveness of the seal is dependent upon the elastic memory of the seal member. There is no provision for positive biasing means to force the complementary sealing surfaces together.

Accordingly, it is an object of this invention to provide a rotatable valve member which is turned into alignment with a cooperating seat and then moved axially of the flow passage into firm engagement with the seat.

It is a further object of this invention to provide a rotatable valve member which is moved axially of the pipeline into and out of sealing engagement with a complementary valve seat.

It is a further object of this invention to provide a rotatable valve which may also be moved axially without rotatable cam members.

It is a further object of this invention to provide a fluid flow control valve, the closure member of which may be rotated about an axis normal to the flow path and moved along the flow path into non-abrading engagement with the valve seat.

It is a further object of this invention to provide a butterfly valve with means for adjusting the planes of the valve disc relative to its shaft axis.

It is a further object of this invention to provide a butterfly valve which may be turned through ninety degrees into alignment with a seat and then moved axially into firm seating engagement, all in response to simple rotational movement of a drive sleeve.

Other objects and advantages of this invention will become apparent from the detailed description herein when read in conjunction with the accompanying drawing.

SUMMARY OF THE INVENTION

This invention contemplates a valve closure member which is slidably but non-rotatably carried on a shaft. Sloping cam surfaces in the form of oblique cylindrical members on the shaft engage complementary internal surfaces in the valve disc to force the disc to move along the axis of the valve flow passages as the shaft is moved along its axis. At the same time, the valve disc is held against movement on the body along the shaft axis. Hence, the valve disc may be rotated through 90° between open and closed position while at all times being free of engagement with the sealing surface on the body. Then, by moving the shaft along its axis, the cam surfaces on the shaft and the valve disc move the disc into firm sealing engagement with the body seat surfaces. To open the valve, the shaft is moved in the opposite direction along its axis to retract the closure disc from the seat. Thereafter, it may be rotated to open position without sliding against the sealing surfaces.

Figure 1:
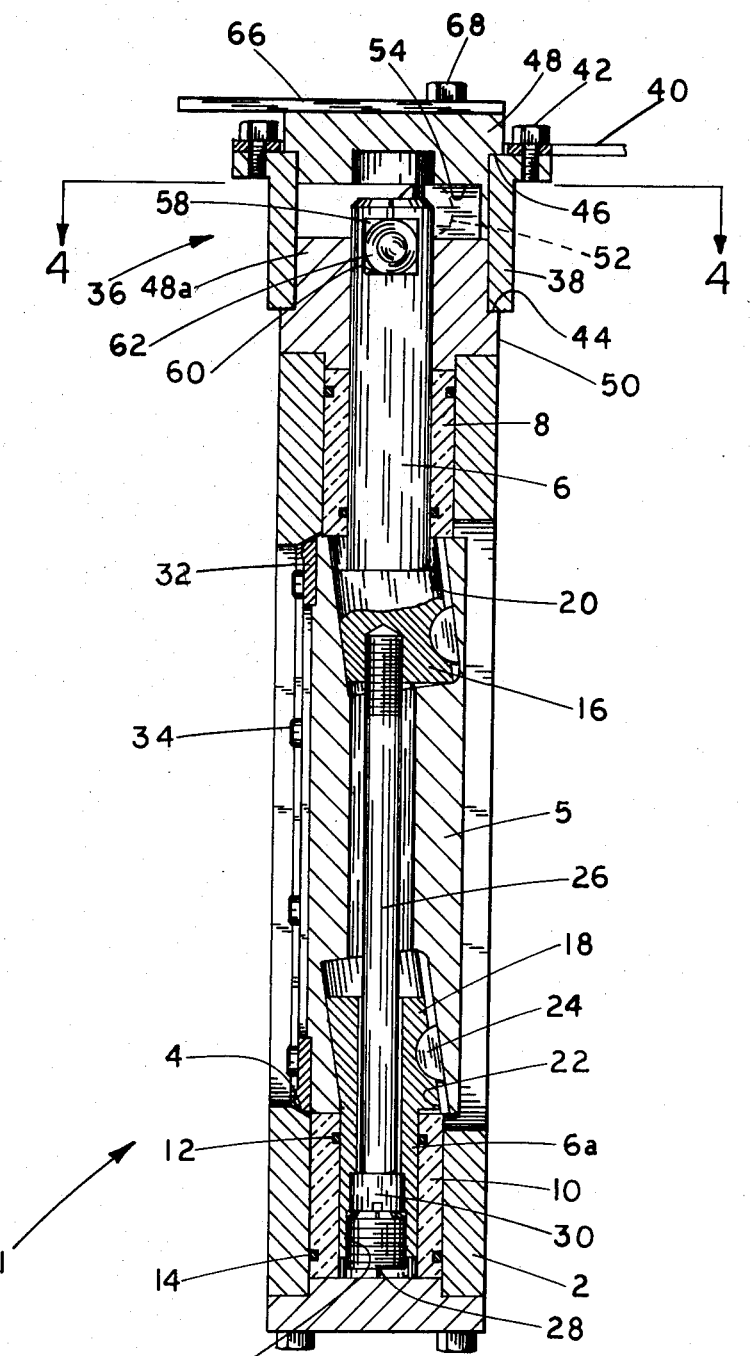
FIG. 1 is a vertical section view of a butterfly valve embodying features of this invention in sealed position.

DESCRIPTION OF A PREFERRED EMBODIMENT now referring to FIG. 1 with greater particularity, there is shown a butterfly valve 1, including a valve body 2 with valve seats 4, and in which a valve closure member, such as the disc 5, is rotatably mounted as by rotating a shaft 6, 6a, on the disc within the bearings 8 and 10. The bearings 8 and 10 are fixed on the body 2 and inner and outer O-rings 12 and 14 are provided to seal the body against leakage. The shaft sections 6 and 6a have oblique cylindrical cam portions 16 and 18, the axies of which are offset at an angle of, say between 5° and 15° from the axis of the shaft 6, 6a and received in complementary oblique cylindrical recesses 20 and 22 in the valve disc 5. While the mating oblique cylindrical surfaces 16, 20 and 18, 22 resist relative rotation between them, the shaft sections 6, 6a are preferably positively keyed to the disc 5 as by means of Woodruff Keys 24.

The oblique cylindrical cam members 16 and 18 are secured together to move as a unit, as by means of a tie rod or bolt 26. Hence, it will be apparent that elevation of the shaft 6, 6a from the position shown in FIG. 1 will cause the cam members 16 and 18 to force the disc 5 toward the right, out of engagement with the valve seat. Then, the shaft 6, 6a may be turned through 90° and by reason of the keys 24, the valve disc 5 will turn with it to open position. To close the valve the shaft 6, 6a is turned back through 90° and then driven down whereby the cam members 16 and 18 force the valve disc 5 firmly against the seat 4. Downward thrust of the tie rod 26 is delivered to the lower cam member 18 through a male plug 28 threaded into a tapped opening 29 at the lower end of the disc 5 into engagement with the head 30 of the tie rod bolt 26. The valve disc 5 is prevented from moving axially of the shaft by engagement with the bearings 8 and 10.

Figure 2:
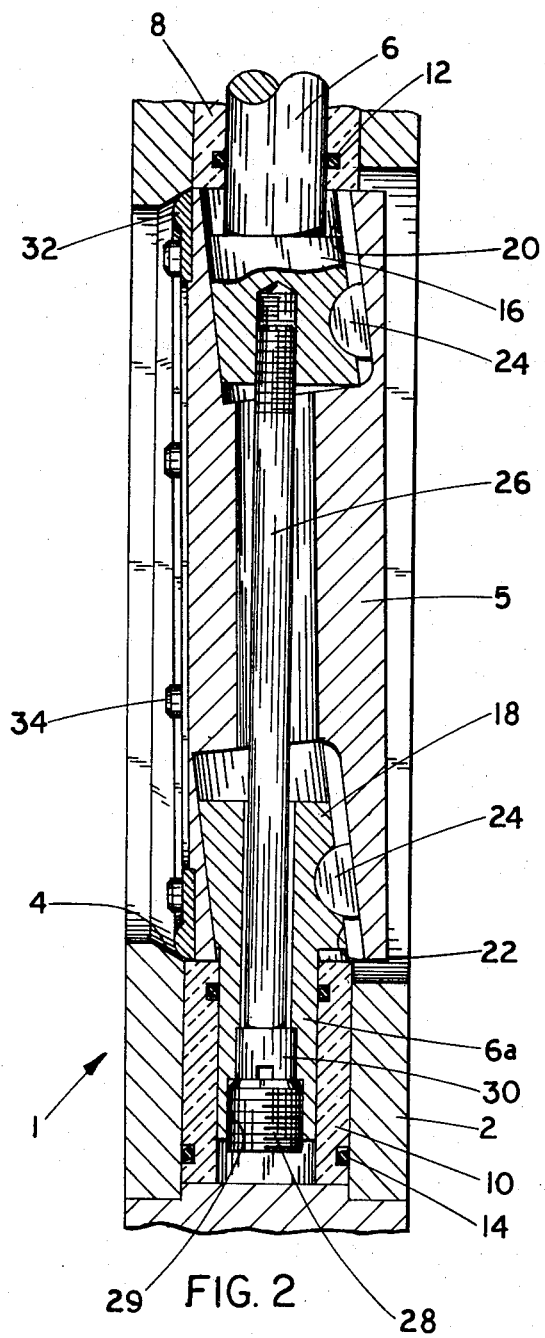
FIGS. 2 and 3 are partial vertical section views of the butterfly valve illustrating an adjustment feature.
Figure 3:
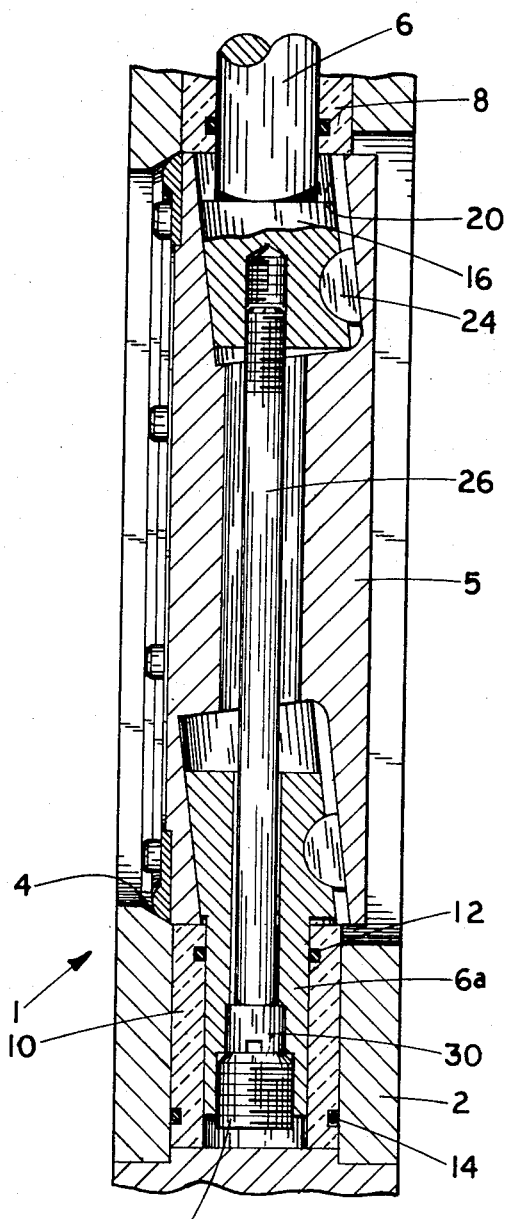

As shown more clearly in FIGS. 2 and 3, the threaded engagement of the tie rod 26 between the cam members 16 and 18 permits the adjustment of the plane of the valve disc 5 to insure firm, uniform seating. In the position of FIG. 2, the valve disc 5 is engaged with the seat 4 at the top, but there is a leakage path clearance at the bottom. However, by reverse threading the tie bolt 26 and replacing the threaded plug 28, the lower portion of the disc 5 is pressed firmly against the seat. If desired, a seal ring 32 is secured to the disc as by means of cap screws 34.

The complementary oblique cylindrical surfaces 16 and 18 of the shaft 6, 6a and the disc recesses 20 and 22 produce an increment of movement along the axis of the valve seat 4 in response to axial movement of the shaft. This increment of movement is equal to the amount of axial movement of the shaft multiplied by the tangent of the angle of incline of the ramp bearing surface 16. For example, with a ramp bearing angle of 7° relative to the shaft axis and an axial movement of one-half inch (0.500 in.), the lateral movement will be:

$$=0.500 \tan 7°$$

$$=0.500 \times 0.123$$

$$=0.062$$

The body seating surface 3 is of conical configuration, with the cone angle being at a tangent to the spherical surface transcribed by edge of the disc 5 as it is rotated about the axis of the shaft 6, 6a. The location of this conical seat surface is such that there is a clearance between the disc seal ring 32 and the seat 4 when the shaft is in its elevated position, and there are interference and high unit seating loads between the disc seal ring 32 and the body seat 4 when the shaft is depressed with the disc edge aligned with the seat, as shown in FIG. 1.

With the valve thus far described, it will be apparent that it is possible to effect tight sealing action without requirement of a resilient seating material. However, it is certainly within the scope of this invention that elastomeric material may be used as desired for the seal ring 32. In fact, the dual action butterfly valve of this invention enables elastomeric materials to be used much more effectively, and under a wider range of operating conditions, than is possible with conventional butterfly valves, which must rely upon the elastic memory of their scaling members.

Figure 4:
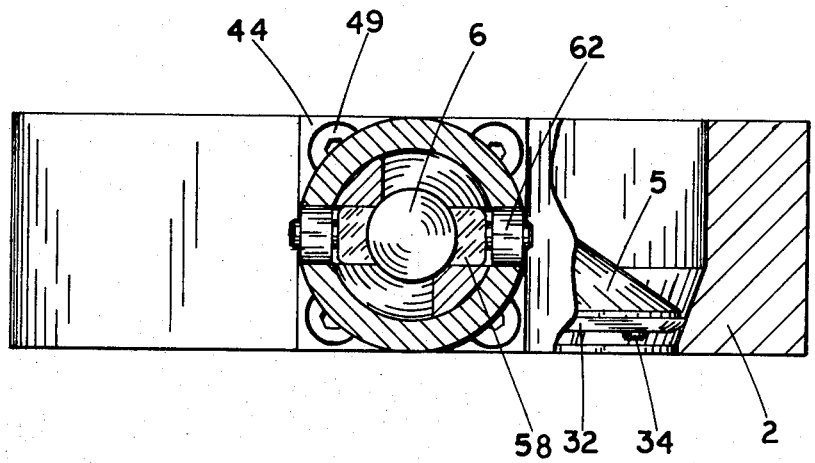
FIG. 4 is a horizontal section view taken along line 4—4 of FIG. 1.
Figure 4A:
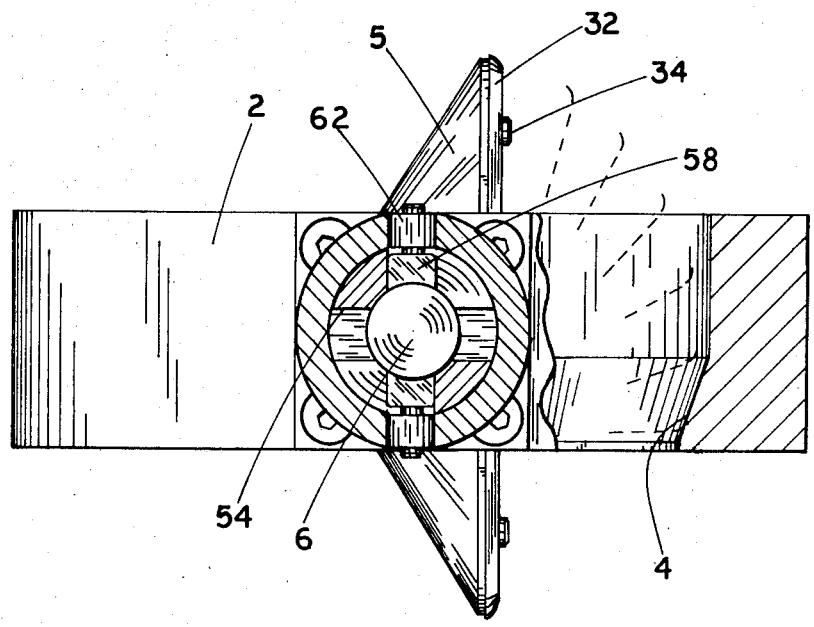
FIG. 4a is a horizontal section view illustrating rotational movement of the valve.
Figure 5:
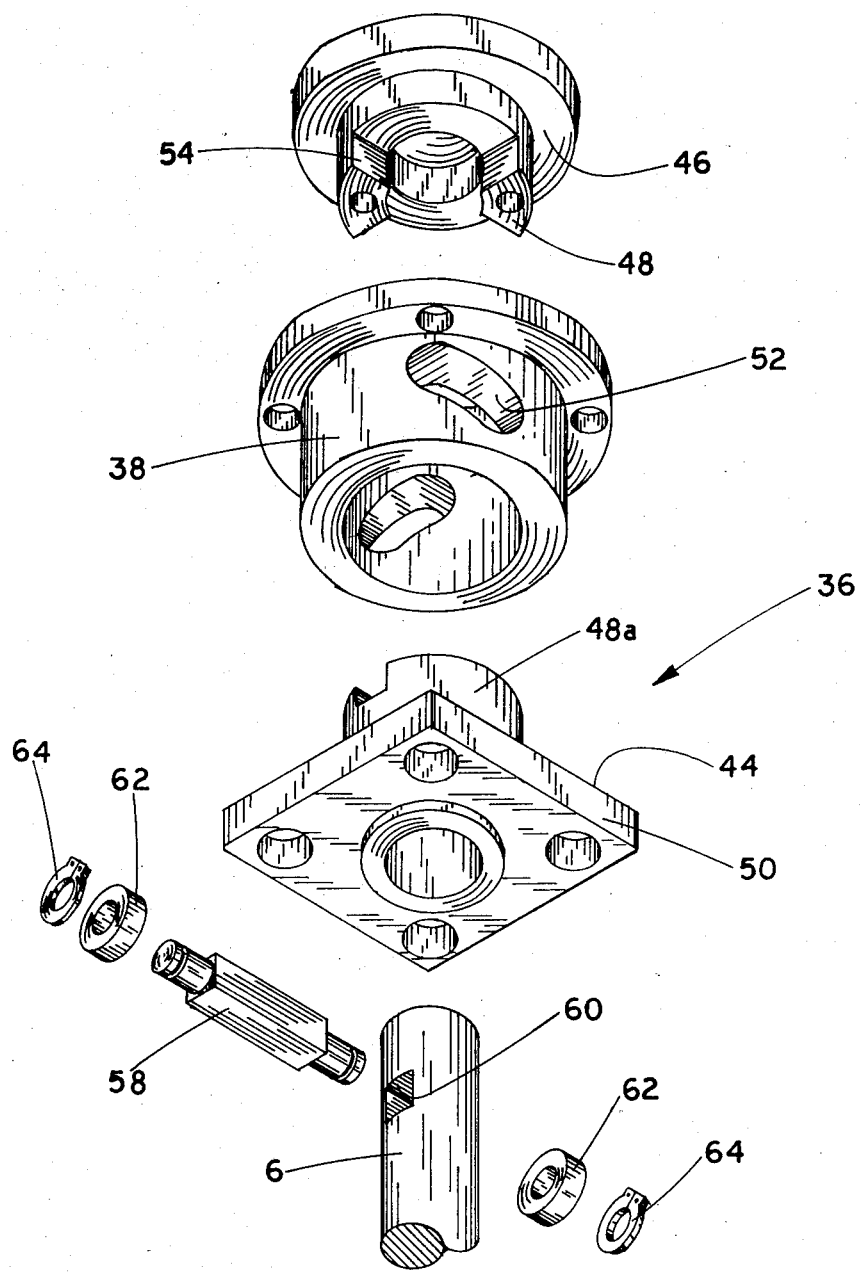
FIG. 5 is an exploded view of the operating mechanism.

Referring now to FIGS. 1, 4 and 5, there is shown an operating mechanism 36 which is particularly conditioned to deliver the previously described sequence of movements to the valve shaft 6 and the disc 5. The operating mechanism 36 is mounted on the upper end of the valve body 2 coaxial with the shaft 6, and includes a drive sleeve 38 to which the handle 40 is bolted at 42. The drive sleeve 38 is rotatably mounted between opposing radial shoulders 44 and 46 on a two-piece pilot sleeve 48, 48a which is secured to the valve body as by means of screws 49 engaging through a flange 50 on the pilot sleeve 48. The pilot sleeve 48 slidably and rotatably receives the upper end of the valve shaft 6.

As shown best in FIG. 5, the rotatable drive sleeve 38 has a pair of diametrically opposed angled slots 52 generated at a camming angle to the axis of the shaft. Preferably, the slots are disposed at from 45° to 30° to the shaft axis and are of sufficient length to have a vertical rise equal to the amount of shaft lift required. The stationary pilot sleeve 48 has a pair of diametrically opposed L-shaped slots 54 to receive a pair of pilot sleeve cam followers as in the form of the ends of a square key 58 which extends through an accommodating hole 60 through the upper end of the shaft 6. Also carried on the shaft drive key 58 are drive sleeve cam follower rollers 62 which are held in place by suitable snap rings 64 and which ride in the angled slots 52 of the drive sleeve. A quadrant 66 (FIG. 1) may be bolted at 68 to the top of the stationary pilot sleeve 48 to indicate positions of, and serve as a lock for, the handle 40.

In operation of the device from full closed and sealed position of the valve, the handle 40 is turned to rotate the drive sleeve 38. During the initial portion of this rotation, the square key 58 is held in the vertical leg portions 54a of the L-slots 54 in the stationary pilot sleeve 48. Hence the shaft 6 is held against rotation as the drive sleeve cam follower rollers 62 climb up the sloping slots 52 to raise the shaft 6 from the position shown in FIG. 1. This axial movement produces the camming action previously described whereby the valve disc 5 is retracted from its seat 4.

Now with the shaft 6 elevated, the pilot sleeve cam followers are in the horizontal legs of the L-slots 54 releasing the shaft drive key 58 for rotation of the shaft 6. At the same time, the drive sleeve cam follower rollers 62 have reached the end of their travel in the angled slots 52 and further rotation of the drive sleeve 38 by means of the handle 40 is transmitted direction to the shaft 6.

While this invention is described in conjunction with a preferred embodiment thereof, it is apparent that modifications and changes may be made by those skilled in the art without departing from the spirit and scope of this invention.

What is claimed is:

1. A rotatable valve structure comprising:
   a valve body having a flow passageway therethrough,
   a valve seat surface in said body around said flow passageway and facing in one direction thereof,
   a shaft member,
   a valve closure disc with a working surface thereon adapted to engage said seat surface and block flow of fluid through said passageway,
   said valve closure disc being axially slidable and non-rotatably carried on said shaft,
   bearing members on said body with the axis thereof displaced from said valve seat in said one direction and rotatably receiving said shaft member,
   said shaft member being axially slidable on said body,
   means restricting movement of said closure member on said body along the axis of said shaft member,
   complementary cam members on said shaft member and said valve closure disc engagable to move said closure member normal to the axis of said shaft member toward and away from said valve seat in response to axial movement of said shaft member,
   the working surface on said valve closure member when aligned with said valve seat being displaced therefrom in said one direction in one axial position of said shaft member and being moved into sealing engagement therewith when said shaft member is moved to another axial position, and a threaded rod extending diametrically through said valve closure disc and interconnecting the cam members on said shaft for adjusting the axial spacing of said cam members on and along said shaft member to fix the location of the plane of said valve closure disc relative to the axis of said shaft member.

2. The rotatable valve structure defined by claim 1 including:

a head on said threaded rod, an internal shoulder in said closure disc passageway engaged by one side of said head, and a plug in said passageway engaging the other side of said head.

3. The rotatable valve structure defined by claim 1 wherein said cam surfaces comprise:

portions of said shaft having surfaces sloping at an angle to the axis of said shaft, and including:

follower surfaces on said closure disc engaged by said sloping surfaces so that said closure member is moved toward and away from said valve seat in response to axial movement of said shaft.

4. The rotatable valve structure defined by claim 3 wherein:

said sloping surfaces and said follower surfaces are of complementary oblique cylindrical configuration.

5. The rotatable valve structure defined by claim 1 including:

a drive sleeve rotatable on said body around the upper end of said shaft, a cam track sloping relatively steeply continuously in one direction extending partially around said drive sleeve, a cam follower projecting radially from said shaft to ride in said track so that rotation of said sleeve through the arc of sam cam track produces axial movement of said shaft, and means holding said shaft against rotation as the sleeve rotates through said arc of the cam track.

6. The rotatable valve structure defined by claim 5 wherein said holding means comprises:

a pilot sleeve fixed to said valve body and slidably and rotatably receiving said shaft member, an L-shaped guide slot in said pilot sleeve with an axial leg thereof of a length substantially the same as the axial extent of said sloping cam track.

a guide follower projecting radially from said shaft member into said L-shaped slot so that rotation of said shaft member is enabled only when said guide follower is in the circumferential portion of said guide slot.

* * * * *